US007438239B2

(12) United States Patent
Woodson

(10) Patent No.: US 7,438,239 B2
(45) Date of Patent: Oct. 21, 2008

(54) FIRE FIGHTING PIERCING NOZZLE DEVICE

(75) Inventor: Damon Eric Woodson, Macon, GA (US)

(73) Assignee: The Southern Company, Atlanta, GA (US)

( * ) Notice: Subject to any disclaimer, the term of this patent is extended or adjusted under 35 U.S.C. 154(b) by 120 days.

(21) Appl. No.: 11/523,380

(22) Filed: Sep. 19, 2006

(65) Prior Publication Data

US 2007/0063070 A1 Mar. 22, 2007

Related U.S. Application Data

(60) Provisional application No. 60/718,291, filed on Sep. 19, 2005.

(51) Int. Cl.
*A01G 25/02* (2006.01)
*A62C 3/06* (2006.01)

(52) U.S. Cl. ........................ 239/272; 239/271; 239/71; 169/54; 169/66; 169/67

(58) Field of Classification Search .................... 239/8, 239/271, 272, 71; 169/14, 54–71
See application file for complete search history.

(56) References Cited

U.S. PATENT DOCUMENTS

| | | | | |
|---|---|---|---|---|
| 102,647 | A * | 5/1870 | Ayres et al. | 175/19 |
| 2,548,621 | A * | 4/1951 | Rutledge | 239/271 |
| 2,993,650 | A * | 7/1961 | Badberg | 239/271 |
| 3,142,340 | A | 7/1964 | Jamison | |
| 4,219,084 | A | 8/1980 | Gray et al. | |
| 4,270,612 | A * | 6/1981 | Larsson | 169/45 |
| 4,466,201 | A | 8/1984 | Larsson | |
| 4,676,319 | A | 6/1987 | Cuthbertson | |
| 4,697,740 | A * | 10/1987 | Ivy | 239/271 |
| 4,802,535 | A * | 2/1989 | Bakke | 169/70 |
| 5,167,285 | A | 12/1992 | Williams et al. | |
| 5,275,243 | A | 1/1994 | Williams et al. | |
| 5,312,041 | A | 5/1994 | Williams et al. | |
| 5,577,561 | A * | 11/1996 | Cook | 169/70 |
| 5,649,599 | A * | 7/1997 | Catanese, Jr. | 169/70 |
| 6,398,136 | B1 * | 6/2002 | Smith | 239/600 |
| 6,668,939 | B2 * | 12/2003 | Schmidt et al. | 169/70 |
| 6,971,451 | B2 * | 12/2005 | Schmieg | 169/70 |
| 7,017,832 | B1 * | 3/2006 | Nelson et al. | 239/271 |
| 7,104,466 | B2 * | 9/2006 | Selak | 239/135 |
| 2003/0159837 | A1 * | 8/2003 | Itschner | 169/70 |

FOREIGN PATENT DOCUMENTS

EP 575284 A1 * 12/1993

* cited by examiner

*Primary Examiner*—Len Tran
*Assistant Examiner*—James S Hogan
(74) *Attorney, Agent, or Firm*—Seyed Kaveh E. Rashidi-Yazd; Troutman Sanders LLP

(57) ABSTRACT

A fire-fighting piercing nozzle device having two chambers for extinguishing and monitoring fires within a storage unit. The fire-fighting piercing nozzle device includes a dispensing system for dispensing fire-fighting materials onto a fire, a temperature measuring system for measuring the temperature within a storage unit to determine the location of a fire, and a combustion gas extraction system for extracting a sample of combustible gas from a storage unit to determine the location of a fire or to determine whether the fire has been properly extinguished. The fire-fighting piercing nozzle device includes a nozzle tip, a plurality of extenders (if necessary), and a head connector.

19 Claims, 3 Drawing Sheets

FIRE FIGHTING PIERCING NOZZLE DEVICE

CROSS REFERENCE TO RELATED APPLICATION

This application claims priority of U.S. Provisional Patent Application No. 60/718,291, filed Sep. 19, 2005, the entire contents of which is hereby incorporated by reference.

TECHNICAL FIELD

The present invention relates generally to a fire fighting piercing nozzle device for preventing the spontaneous combustion or self-ignition of materials within a bunker, bin, or silo, and in particular to a fire fighting piercing nozzle device having a temperature probe and separate injector tubes for preventing the spontaneous combustion or self-ignition of materials within a bunker, bin, or silo.

BACKGROUND OF THE INVENTION

Spontaneous combustion of organic material is a complicated process and a number of conditions must be fulfilled in order for it to take place. Although many of the conditions under which spontaneous combustion takes place are not as yet completely understood, it is known that all spontaneous combustion processes require an accurately defined environment.

The features defining such an environment include suitable heat insulation and a sufficient air supply, although the amount of air required is normally very small. It is also known that the heating process preceding the stage at which the product bursts into flame (e.g., the uncontrolled propagation of an oxidation process) is caused either by thermophilic bacteria or by some form of auto-oxidation process as a result of production processes. The former is true in respect to a number of organic substances, such as sawdust, wood waste, hay, peat, wheat, corn, flour, bark, woodchips, pine needles, green wood, and other organic materials, while the latter case is true with respect to a number of other self-combustible materials, such as oil, gas, coal, fiberboard, sulfur, powder iron, and iron chips. Also, the presence of moisture and impurities having a catalytic effect are often conditions under which spontaneous combustion is likely to occur.

Accordingly, the use of bins, bunkers, and silos to store the above products has been problematic, because the products inside can begin to spontaneously combust. The generated fire, however, cannot be seen from outside of the bins, bunkers, or silos. Only a significant rise in heat can be detected. When a fire bums deep inside a silo, it makes a pocket that will fill with combustion gasses and air.

To address such problems, piercing type nozzles for use with fire extinguishing equipment have been utilized in the past and in one particular device the nozzle has a pointed head, which is manually forced through the shell or barrier of the silo or bin that is to be penetrated. Oftentimes the strength of the barrier is sufficient to prevent the manually forcing of the penetrating nozzle into the silo or bin. In one attempt to overcome this problem, explosively operated piercing applicators have been utilized. This type of applicator is not practical for use in a possibly explosive atmosphere such as would often be encountered in a fire within a silo, bin, or bunker. Sledgehammer operated penetrating fire extinguishing nozzles have also been proposed.

One such piercing type nozzle is disclosed in U.S. Pat. No. 2,548,621 to Rutledge. The penetrating nozzle includes a single section, which can be driven into a bulk powder material or hay bale, for example. Once the piercing nozzle has been driven into the material, the piercing nozzle can inject a substance, such as a fire-fighting substance, into the material to extinguish a fire. Accordingly, the penetrating nozzle can be connected to a portable extinguisher to assist in extinguishing a fire.

As disclosed, the penetrating nozzle, however, can only inject one fire-fighting agent and cannot detect the precise location of the fire within the material in which the piercing nozzle has been injected into. Further, the disclosed penetrating nozzle cannot draw a sample of the combustion gas from the material to assist in determining the location of the fire within the material. The piercing nozzle disclosed is of a predetermined size and, therefore, can only be used in a limited area within the combustible material. Accordingly, the piercing nozzle may not be effective in larger silos, bins, or bunkers.

Another piercing nozzle is disclosed in U.S. Pat. No. 4,219,084 to Gray et al. The piercing nozzle includes a built-in hammer (a slide hammer), so that the piercing nozzle can be carried to a location where the slide hammer is used to push the piercing nozzle into a device, such as a bin, or material. More particularly, the disclosed piercing nozzle is used to push through the exterior of on aircraft, to extinguish fires that occur inside of the airplane.

As disclosed, the piercing nozzle, however, can only inject one type of fire-fighting material. Further, the piercing nozzle cannot take a combustion gas sample and cannot measure the temperature within the aircraft. Like Rutledge, the piercing nozzle disclosed in Gray et al. is not extendable and, therefore, is restricted in size. Such a limitation prevents the piercing nozzle from being used in larger bins, bunkers, or silos. Additionally, the disclosed piercing nozzle is limited in the amount of force that can be applied to the piercing nozzle by the slide hammer. Accordingly, the piercing nozzle must be used for compartments or devices having a thin exterior or skin, such as an airplane fuselage.

Yet another piercing nozzle is disclosed in U.S. Pat. No. 4,270,612 to Larsson. While the piercing nozzle of Larsson has two tubes, the injection source for both tubes is the same. Accordingly, only one type of fire-fighting material can be used. The piercing nozzle disclosed has multiple orifices for dispersing the fire-fighting material. The orifices are arranged over the whole length of the piercing nozzle in order to spray fire-fighting material over a larger area to extinguish the fire.

The disclosed piercing nozzle, however, cannot measure temperature to locate a fire within a bunker, bin, or silo. Additionally, the entire piercing nozzle must be inserted into the source (e.g., storage bin), which may collapse the pocket of combustible gas, thereby causing an explosion. Such an explosion might cause damage to property or equipment or even death to a firefighter.

The nozzle disclosed in Larsson includes a piercing tip having an angle of approximately 45 degrees. Such an angle makes it more difficult to push the piercing nozzle into the device, because of friction. Finally, the piercing nozzle, as disclosed, does not have an end conducive for driving the piercing nozzle into the device (such as a bin, bunker, or silo). More specifically, the disclosed nozzle is intended for insertion into a tank or device before the potentially combustible materials are stored therein. The main purpose of the piercing nozzle is to push air or seawater into the device as a fluffing agent to drive off combustible gas build-up. Accordingly, the piercing nozzle disclosed is used mainly to prevent fires, not to extinguish them.

Still another piercing nozzle is disclosed in U.S. Pat. No. 4,466,201 to Larsson. The disclosed piercing nozzle is mainly used to provide a drying agent to the material within a device and, therefore, is not intended for temporarily insertion using a hammer or similar device. Rather, the nozzle is intended for permanent installation into the device and is not a fire-fighting apparatus.

The nozzle also comprises a plurality of orifices in order to aerate the materials, such as bulk powder. Although the nozzle is adequate for drying the materials within a tank, the nozzle is not equipped for extinguishing fires that occur within the tank. Further, the nozzle cannot read temperature to determine the precise location of a fire within a bin, bunker, or silo.

Another piercing nozzle is disclosed in U.S. Pat. No. 4,676,319 to Cuthbertson. The piercing nozzle is portable and can bore into a tank or bin, but is mainly intended for gas fires that may occur within the fuselage of an airplane. The piercing nozzle is specifically designed for boring into the device and injecting a fire-fighting agent, such as foam. The disclosed nozzle, however, can only inject one type of fire-fighting agent at a time and cannot measure the temperature within the device to determine the precise location of the fire.

More specifically, the disclosed piercing nozzle is designed to drill a hole where one did not exist previously. Instead of relying on a hammer or similar device to pound the piercing nozzle into the source, the disclosed piercing nozzle relies on mechanical energy (not human energy) to push the piercing nozzle. Such an ability is not generally necessary in bins, silos or other types of storage tanks, because such devices generally have openings or portholes for inserting a piercing nozzle. The disclosed piercing nozzle, therefore, would generally be used for fuselage fires in aircraft and vehicles. Further, the piercing nozzle is not capable of extracting a sample of combustion gas in order to determine the location of the fire and whether the fire has been properly extinguished.

Other devices, such as those disclosed in U.S. Pat. Nos. 5,167,285, 5,275,243, and 5,312,041 to Williams et al., have been designed for fighting fires using a dry powder. The disclosed dry powder guns, however, are not designed for fighting internal fires within a bin, bunker, or silo. Instead, these devices are used to fight surface fires. The disclosed dry powder guns spray the fire-fighting agent on the surface of a fire and, therefore, are not extendable, do not read temperatures, and do not pierce sources, such as storage bins. Although one of the dry powder guns can adjust the stream of fire-fighting agent, while another can produce two types of fire-fighting agents to apply to a fire, none of the devices disclosed could effectively be used to fight fires that occur internally within a device.

What is needed is a piercing nozzle for penetrating a storage tank (such as a bin, bunker, or silo) that can be extended to a desirable length, dispense at least two fire-fighting agents, read the temperature within the storage tank, extract combustion gas from within the storage tank, and which can be inserted into the storage tank with the use of a sledgehammer or similar device. It is to such a device that the present invention is primarily directed.

BRIEF SUMMARY OF THE INVENTION

Briefly described, in preferred form, the present invention is a fire-fighting piercing nozzle device having two chambers for extinguishing and monitoring fires within a storage unit. The fire-fighting piercing nozzle device includes a dispensing system for dispensing fire-fighting materials onto a fire, a temperature measuring system for measuring the temperature within a storage unit and determining the location of a fire, and a combustion gas extraction system for extracting a sample of combustible gas from a storage unit to determine the location of a fire or to determine whether the fire has been properly extinguished. The fire-fighting piercing nozzle device includes a nozzle tip, a plurality of extenders (if necessary), and a head connector.

The nozzle tip is adapted to be pushed into a storage unit for the application of fire-fighting materials, for monitoring the temperature, and/or for extracting combustible gases. The plurality of extenders allow the nozzle tip to be pushed any practical distance within a storage unit, while the head connector receives a striking force to push the nozzle tip and extenders into the storage unit. The head connector can also be connected to multiple fire-fighting materials, a temperature monitor, and/or a suction device to extract combustible gases.

The nozzle tip includes a first set of apertures that lead to a first chamber within the fire-fighting piercing nozzle device and a second set of apertures that lead to a second chamber within the fire-fighting piercing nozzle device. The two chambers do not mix and, therefore, multiple fire-agents can be used on a fire, multiple samples of combustible gases can be extracted from the storage unit, or one fire-fighting material can be applied and one sample of combustible gases can be extracted, simultaneously.

The nozzle tip includes a temperature sensor adapted to measure the temperature within a storage unit. The nozzle tip can be combined with multiple extenders to reach a desired length to combat fire within a storage unit. The head connector can be used as a striking plate for a hammer, such as a sledge hammer, for pushing the nozzle tip and extenders into the storage unit to reach the fire for proper extinguishment.

A principle object of the present invention is to provide a fire-fighting piercing nozzle device having two chambers for dispensing two different fire-fighting materials, extracting two samples of combustible gas, or dispensing a fire-fighting material and extracting a sample of combustible gas, simultaneously.

Another object of the present invention is to provide a fire-fighting piercing nozzle device having a temperature sensor for determining the location of a fire within a storage unit.

Still another object of the present invention is to provide a fire-fighting piercing nozzle device capable of determining the location of a fire or whether a fire has been adequately extinguished by extracting combustible gas from a storage unit.

It is another object of the present invention to provide a nozzle tip having a tapered end that can be easily inserted into a storage unit.

Yet another object of the present invention is to provide a plurality of extenders adapted to extend the fire-fighting piercing nozzle device to any desirable size.

Another object of the present invention is to provide a head connector adapted to connect to two different fire-fighting sources, two different suction sources for extracting combustible gas, a temperature monitor, and/or one fire fighting source and one suction source, simultaneously.

These and other objects, features and advantages of the present invention will become more apparent upon reading the following specification in conjunction with the accompanying drawings.

DETAILED DESCRIPTION OF THE PREFERRED EMBODIMENTS

Figure 1A:
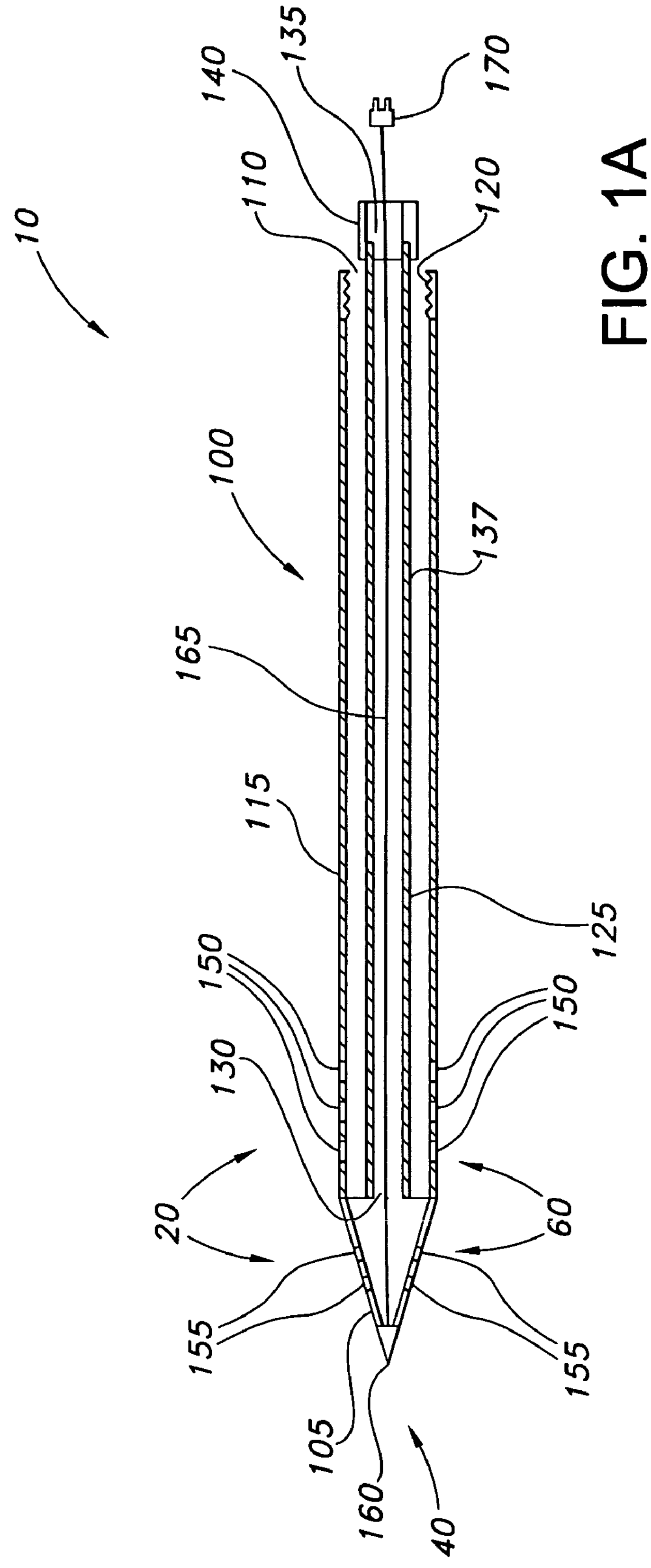
FIGS. 1A-1B, collectively known as FIG. 1, illustrate cross-sectional views of a nozzle tip for a fire-fighting piercing nozzle device in accordance with preferred embodiments of the present invention.
Figure 1B:
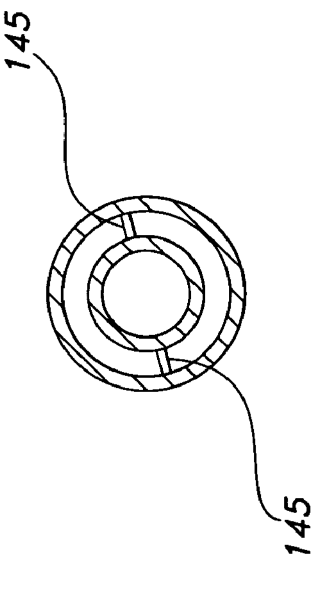
Figure 2:
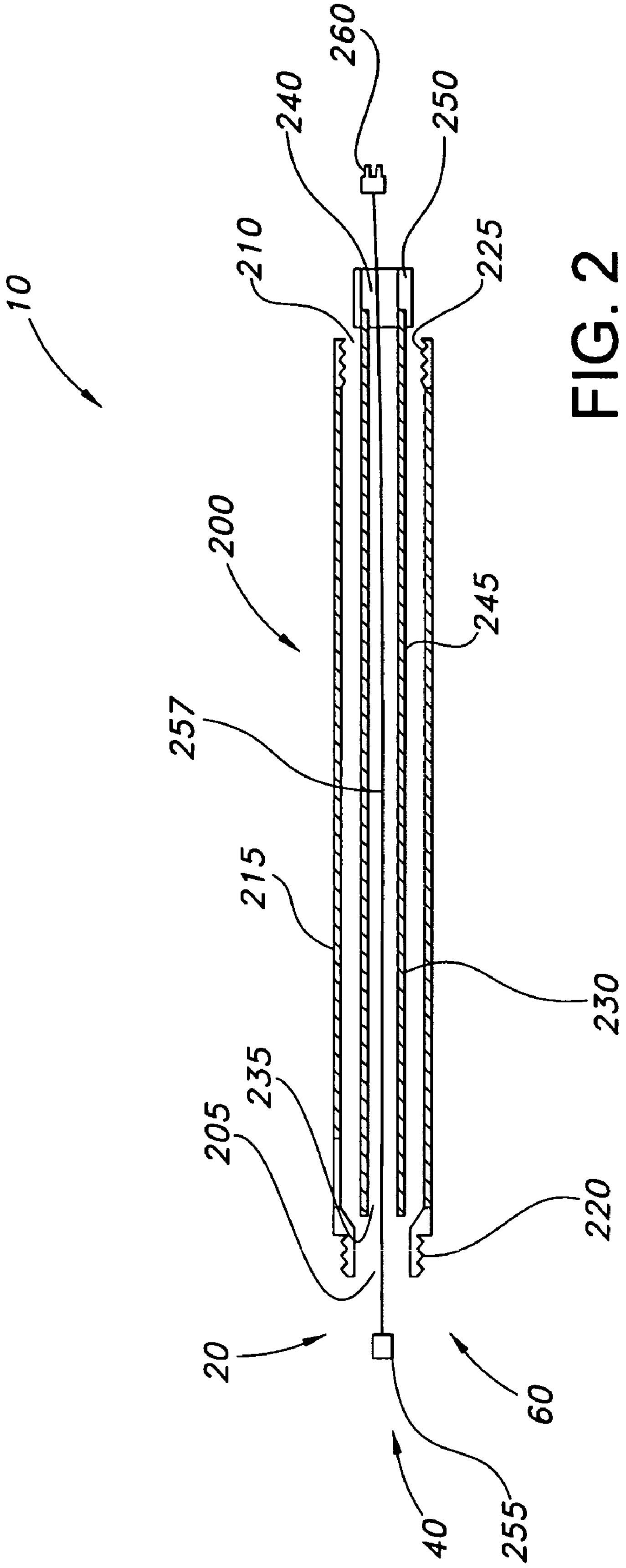
FIG. 2 illustrates a cross-sectional view of an extender for a fire-fighting piercing nozzle device in accordance with preferred embodiments of the present invention.
Figure 3:
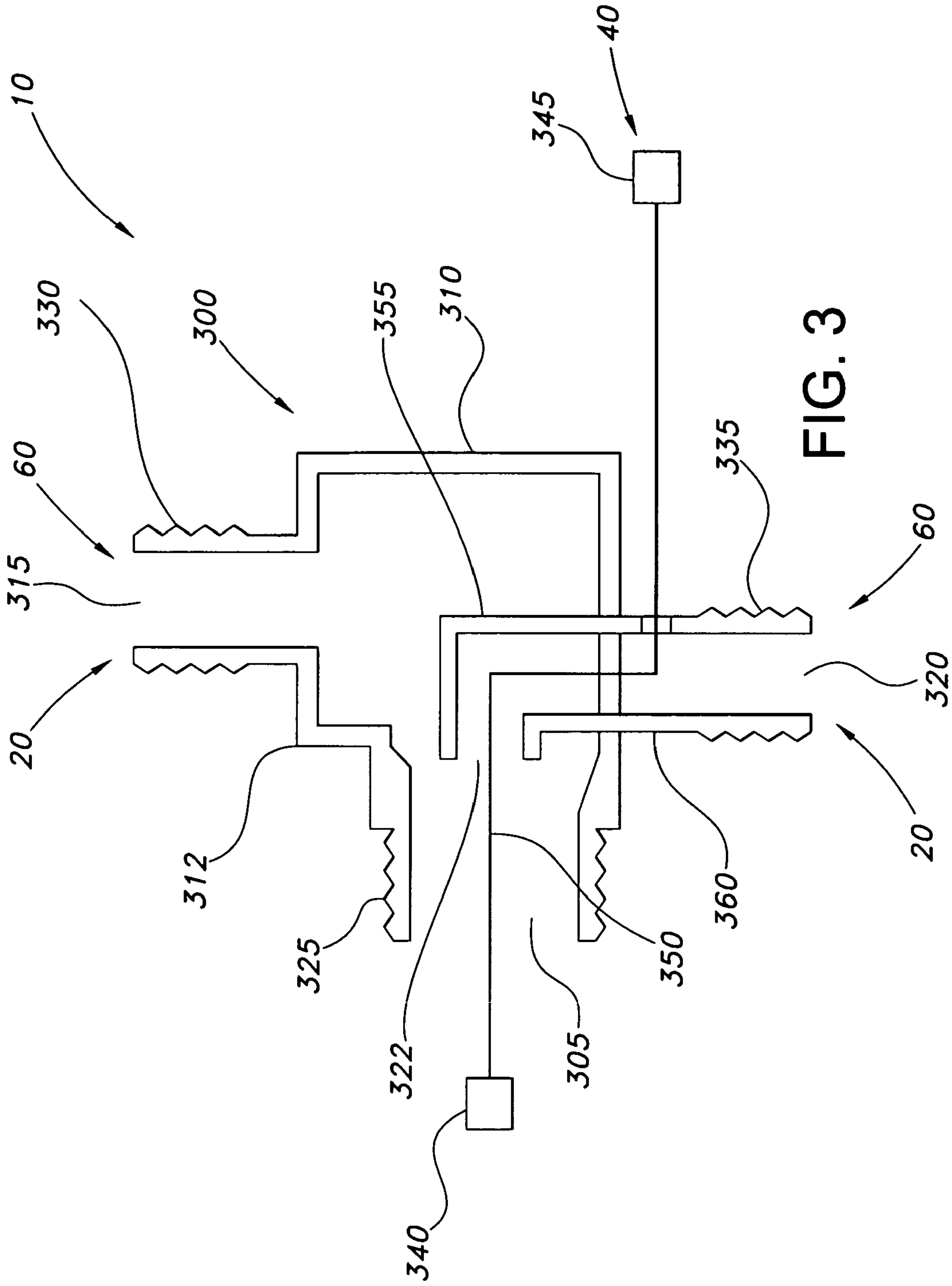
FIG. 3 illustrates a head connector for a fire-fighting piercing nozzle device in accordance with preferred embodiments of the present invention.

Referring now in detail to the drawing figures, wherein like reference numerals represent like parts throughout the several views, a fire-fighting piercing nozzle device 10 of FIGS. 1-3 is designed for detecting, locating, and extinguishing a fire within a device or storage unit such as, but not limited to, a bin, bunker, and silo. The fire-fighting piercing nozzle device 10 provides an extendable piercing nozzle, while eliminating multiple problems of previously designed piercing nozzles. The fire-fighting piercing nozzle device 10 can be configured in various sizes and shapes conducive for insertion into a storage unit or other device and, more particularly, for detecting, locating, and extinguishing a fire within a storage unit or device.

As illustrated in FIGS. 1-3, the fire-fighting piercing nozzle device 10 comprises a dispensing system 20, a temperature measuring system 40, a combustion gas extraction system 60, a nozzle tip 100, a plurality of extenders 200, and a head connector 300. The dispensing system 20 is adapted to dispense at least one and preferably two different types of fire-extinguishing materials. The dispensing system 20 can apply the two different types of fire-extinguishing materials separately or simultaneously. The dispensing system 20, therefore, utilizes two different chambers within the fire-fighting piercing nozzle device 10.

The temperature measuring system 40 is adapted to measure the temperature within the device or storage unit and provide the temperature to a fire-fighter utilizing the fire-fighting piercing nozzle device 10 outside the device or storage unit. The temperature measuring system 40 provides the fire-fighter the ability to determine the precise location of the fire within the device or storage unit, thereby providing more accurate fire-fighting capabilities.

The combustion gas extraction system 60 is adapted to extract a sample of combustion gas from within the device or storage unit. One or more of the chambers of the dispensing system 20 can be used by the combustion gas extraction system 60 for the extraction of combustion gas. The extracted gas can be examined to determine whether the fire has been properly extinguished and/or to determine the precise location of the fire within the device or storage unit, as a fire generally produces a pocket of combustion gas as it burns within the device or storage unit.

The nozzle tip 100, plurality of extenders 200 (if necessary), and the head connector 300 collectively represent the housing of the fire-fighting piercing nozzle device 10. Accordingly, the dispensing system 20, temperature measuring system 40, and combustion gas extraction system 60 are containable within the nozzle tip 100, plurality of extenders 200, and the head connector 300. The nozzle tip 100 is designed to effectively penetrate the device or storage unit, while the plurality of extenders 200 can be used to insert the nozzle tip 100 any distance within the device or storage unit. The head connector 300 is adapted for providing fire-extinguishing materials, acquiring temperature readings, and extracting combustible gas from within the device or storage unit via the nozzle tip 100 and the plurality of extenders 200. Further, the head connector 300 is specifically designed for receiving multiple driving forces used for pushing the nozzle tip 100 and plurality of extenders 200 into the device or storage unit. Such driving forces include, but are not limited to, repetitive strikes to the head connector 300 by a non-sparking hammer, such as a sledge hammer.

The dispensing system 20, temperature measuring system 40, and combustion gas extraction system 60 comprise the combination of various components of the nozzle tip 100, plurality of extenders 200, and head connector 300, as described more fully below. As will become more apparent from the description to follow, particular components of the nozzle tip 100, plurality of extenders 200, and head connector 300 can be utilized collectively by the dispensing system 20, temperature measuring system 40, and combustion gas extraction system 60. One skilled in the art will recognize that different combinations of components can be employed without departing from the scope of the present invention.

As illustrated in FIGS. 1A-1B, the nozzle tip 100 comprises a closed first end 105 that is tapered to define a point, an open second end 110, and a peripheral side wall 115 that extends from the closed first end 105 to the open second end 110. The peripheral side wall 115, therefore, defines a hollow cavity or chamber between the closed first end 105 and the open second end 110 of the nozzle tip 100.

A tapered closed first end 105 is desirable, because piercing nozzles generally have size limitations. The bigger the diameter of the piercing nozzle, the more friction exists when pushing the piercing nozzle into a storage unit or device. Accordingly, a piercing nozzle with a smaller diameter is preferred. To combat friction, the nozzle tip 100 includes a tapered closed first end 105 that is similar in shape to that of a sharpened pencil. Such a shape produces less friction when inserted into the storage unit or device, thereby making it easier to use to fight fires. Other shapes are not as easy to insert.

One skilled in the art will recognize that the tapered closed first end 105 can be of varying degrees. In a preferred embodiment of the present invention, the tapered closed first end 105 comprises a seventy degree angle to ease penetration of the needle tip 100 into the storage unit.

The nozzle tip 100 further comprises an inner tube 125 substantially containable within the nozzle tip 100, such that the inner tube 125 slightly extends beyond the open second end 110 of the nozzle tip 100. The inner tube 125 includes an open first end 130 positioned near the closed first end 105 of the nozzle tip 100, an open second end 135 positioned near the open second end 110 of the nozzle tip 100, and a peripheral side wall 137 that extends from the open first end 130 and the open second end 135, such that the peripheral side wall 137 defines a hollow cavity or chamber between the open first end 130 and the open second end 135.

Further, a portion of the peripheral side wall 137 located at the open first end 130 of the inner tube 125 is in communication with the inside of the peripheral side wall 115 of the nozzle tip 100. Accordingly, the hollow cavity or chamber defined by the peripheral side wall 115 of the nozzle tip 100 is not in communication with the hollow cavity or chamber defined by the peripheral side wall 137 of the inner tube 125. Such a configuration defines two separate hollow cavities or chambers within the nozzle tip 100.

More specifically, the first chamber or hollow cavity extends vertically between the inside of the peripheral side wall 115 of the nozzle tip 100 and the outside of the peripheral side wall 137 of the inner tube 125, such that the first chamber or hollow cavity extends horizontally between the portion of the peripheral side wall 137 of the inner tube 125 that connects with the inside of the peripheral side wall 115 of the nozzle tip 100 and the open second end 110 of the nozzle tip 100. In a preferred embodiment of the present invention, the peripheral side wall 137 of the inner tube 125 connects with the inside of the peripheral side wall 115 of the nozzle tip 100 just before the closed first end 105 of the nozzle tip 100 begins to taper to a point.

The second chamber or hollow cavity extends vertically within the peripheral side wall 137 of the inner tube 125 and extends horizontally between the closed first end 105 of the nozzle tip 100 and the open second end 135 of the inner tube 125. Accordingly, the space defined by the tapering closed first end 105 of the nozzle tip 100 forms part of the second chamber or hollow cavity.

The nozzle tip 100 can further comprise a plurality of support ribs 145 in communication with the inside portion of the peripheral side wall 115 of the nozzle tip 100 and the outside portion of the peripheral side wall 137 of the inner tube 125. The plurality of support ribs 145 are adapted to prevent the peripheral side wall 115 of the nozzle tip 100 from collapsing onto the peripheral side wall 137 of the inner tube 125 during periods of extreme temperatures. Additionally, the plurality of support ribs 145 are adapted to prevent the inner tube 125 from deflecting under pressure. The support ribs 145, however, are designed not to divide the first hollow cavity or chamber into separate portions, thereby maintaining a clear flow passage within the first hollow cavity or chamber.

The peripheral side wall 115 of the nozzle tip 100 is defined to form a first plurality of apertures 150, such that the first plurality of apertures 150 are positioned equally around the circumference of the peripheral side wall 115 near the closed first end 105 of the nozzle tip 100. The first plurality of apertures 150 defines a pathway between the outside of the nozzle tip 100 and the first hollow cavity or chamber inside the nozzle tip 100. Accordingly, a fire-fighting material can be forced from the first hollow cavity or chamber inside the nozzle tip 100 to outside the nozzle tip 100 via the first plurality of apertures 150. Similarly, a sample of combustible gas can be extracted from outside the nozzle tip 100 and provided to the first hollow cavity or chamber inside the nozzle tip 100 via the first plurality of apertures 150.

The tapering closed first end 105 of the nozzle tip 100 is defined to form a second plurality of apertures 155, such that the second plurality of apertures 155 are positioned evenly around the tapering closed first end 105 of the nozzle tip 100. The second plurality of apertures 155 defines a pathway between the outside of the nozzle tip 100 and the second hollow cavity or chamber inside the inner tube 125 of the nozzle tip 100. Accordingly, as second fire-fighting material can be forced from the second hollow cavity or chamber inside the nozzle tip 100 to outside the nozzle tip 100 via the second plurality of apertures 155. Similarly, a sample of combustible gas can be extracted from outside the nozzle tip 100 and provided to the second hollow cavity or chamber inside the nozzle tip 100 via the second plurality of apertures 155.

One skilled in the art will recognize that each aperture in the first plurality of apertures 150 and the second plurality of apertures 155 can vary in size and shape. In a preferred embodiment of the present invention, each aperture in the first plurality of apertures 150 and the second plurality of apertures 155 is approximately one-quarter inch to one-half inch in diameter.

As the pressure generally used to insert fire-fighting materials is in a range between 50 to 150 pounds per square inch (PSI), the first plurality of apertures 150 and the second plurality of apertures 155 will not clog or be blocked by material during the insertion of the nozzle tip 100. Such pressure effectively cleans the first plurality of apertures 150 and the second plurality of apertures 155 during use.

The nozzle tip 100 can further comprise a temperature sensor 160, such as a thermocouple or other suitable temperature sensor that can withstand severe temperature. The temperature sensor 160 is generally positioned at the defined point or tip of the tapering closed first end 105 of the nozzle tip 100. The temperature sensor 160 is adapted to measure the temperature of the outside temperature experienced by the nozzle tip 100, such that the temperature sensor 160 can assist in determining the precise location of a fire within the device or storage unit.

The temperature sensor 160 is in communication with a temperature sensor wire 165 that runs the approximate length of the nozzle tip 100. More specifically, the temperature sensor wire 165 runs from the temperature sensor 160 located at the closed first end 105 of the nozzle tip 100, through the inside of the inner tube 125, and to the open second end 135 of the inner tube 125, where the temperature sensor wire 165 communicates with a temperature sensor coupling 170. The temperature sensor coupling 170 is adapted to connect to another temperature sensor coupling (see below) or to a temperature sensor monitor (not shown), such as a thermocouple monitor, voltmeter, or other suitable monitor.

One skilled in the art will recognize that the temperature sensor 160 must be able to measure extreme temperatures. Such a temperature sensor 160 can include, but is not limited to, a thermocouple or resistance temperature detector (RTD). In a preferred embodiment of the present invention, the temperature sensor 160 is a RTD, wherein the temperature sensor wire 165, 257, 350 is made of platinum. Such wiring can withstand much higher temperatures (e.g., much greater than 2,000 degrees Fahrenheit) without melting. The temperature sensor 160 can be used to acquire the measurement of temperature within a storage unit or device. Once a predetermined temperature reading is detected, a fire-fighting material can be inserted into the storage bin to ensure that the fire-fighting piercing nozzle device 10 is not damaged. Accordingly, the temperature sensor 160 can effectively determine the location of the fire within the storage unit to ensure that the fire is properly extinguished.

The nozzle tip 100 also comprises internal threads 120, or other suitable connecting element, such that the nozzle tip 100 can be connected to an extender 200 or a head connector 300. Typically, the internal threads 120 are located on the inside of the peripheral side wall 115 of the nozzle tip 100 near the open second end 110 of the nozzle tip 100.

To ensure that the second hollow cavity or chamber remains separate from the first hollow cavity or chamber, the nozzle tip 100 can further comprise an inner tube coupling 140, such that the inner tube coupling 140 is adapted to communicate with an extension of the inner tube 125. Typically, the inner tube coupling 140 is positioned on the open second end 135 of the inner tube 125 and is adapted to seal the inner tube 125 with another tube or connection.

As illustrated in FIG. 2, each of the plurality of extenders 200 comprises an open first end 205 adapted to engage the open second end 110 of the nozzle tip 100, an open second end 210 adapted to engage the open first end 205 of another extender 200 or engage the head connector 300, and a peripheral side wall 215 that extends from the open first end 205 to the open second end 210. The peripheral side wall 215, therefore, defines a hollow cavity or chamber between the open first end 205 and the open second end 210 of each extender 200.

Each extender 200 further comprises an inner tube 230 substantially containable within the extender 200, such that the inner tube 230 slightly extends beyond the open second end 210 of the extender 200. The inner tube 230 includes an open first end 235 positioned near the open first end 205 of the extender 200, an open second end 240 positioned near the open second end 210 of the extender 200, and a peripheral side wall 245 that extends from the open first end 235 to the open second end 240, such that the peripheral side wall 245 defines a hollow cavity or chamber between the open first end 235 and the open second end 240.

The peripheral side wall 245 of the inner tube 230 of the extender 200, however, does not physically separate the hollow cavity or chamber defined by the peripheral side wall 215 of the extender 200 and the hollow cavity or chamber defined by the peripheral side wall 245 of the inner tube 230. Such a separation occurs when the extender 200 is engaged with the nozzle tip 100, as described more fully below. The inner tube 230 is positioned approximately parallel and horizontal with the extender 200.

More specifically, the first chamber or hollow cavity extends vertically between the inside of the peripheral side wall 215 of the extender 200 and the outside of the peripheral side wall 245 of the inner tube 230, such that the first chamber or hollow cavity extends horizontally between the open first end 205 of the extender 200 and the open second end 210 of the extender 200. The second chamber or hollow cavity extends vertically within the peripheral side wall 245 of the inner tube 230 and extends horizontally between the open first end 235 of the inner tube 230 and the open second end 245 of the inner tube 230.

Similar to the nozzle tip 100, the extender 200 can include a plurality of support ribs 145 in communication with the inside portion of the peripheral side wall 215 of the extender 200 and the outside portion of the peripheral side wall 245 of the inner tube 230. The plurality of support ribs 145 are adapted to prevent the peripheral side wall 215 of the extender 200 from collapsing onto the peripheral side wall 245 of the inner tube 230 during periods of extreme temperatures.

The extender 200 can further comprise a first temperature coupling 255 and a second temperature coupling 260, wherein the first temperature coupling 255 and second temperature coupling 260 are in communication with each other via a temperature sensor wire 257. The first temperature coupling 255 is generally positioned near the open first end 205 of the extender 200. The first temperature coupling 255 is adapted to engage the temperature coupling 170 of the nozzle tip 100.

The temperature sensor wire 257 runs from the first temperature coupling 255, through the inside of the inner tube 230, and to the second temperature coupling 260 generally positioned near the open second end 210 of the extender 200. The second temperature sensor coupling 260 is adapted to connect to another temperature sensor coupling (e.g., part of another extender 200) or to a temperature sensor monitor, such as a thermocouple monitor, voltmeter, or other suitable monitor. In other words, the first temperature sensor coupling 255, second temperature sensor coupling 260, and temperature sensor wire 257 are adapted to relay the temperature reading of the temperature sensor 160 of the nozzle 100 to another temperature sensor coupling (e.g., another extender 200) or to a temperature sensor monitor.

The extender 200 also comprises internal threads 225, or other suitable connecting element, such that the extender 200 can be connected to another extender 200 or a head connector 300. Typically, the internal threads 225 are located on the inside of the peripheral side wall 215 of the extender 200 near the open second end 210 of the extender 200.

Moreover, the extender 200 comprises external threads 220, or other suitable connecting element, such that the external threads 200 of the extender 200 can engage the internal threads 120 of the nozzle tip 100 or the internal threads 225 of another extender 200. Typically the external threads 220 of the extender are positioned on the outside of the peripheral side wall 215 of the extender near the open first end 205 of the extender 200.

Similar to the nozzle tip 100, the extender 200 can further comprise an inner tube coupling 250, such that the inner tube coupling 250 is adapted to communicate with an extension of the inner tube 230 of another extender 200. Typically, the inner tube coupling 250 is positioned near the open second end 240 of the inner tube 230 and is adapted to seal the inner tube 230 with another tube or connection.

As illustrated in FIG. 3, the head connector 300 can comprise an open first end 305 adapted to engage the open second end 110 of the nozzle tip 100 or the second open end 210 of an extender 200, a closed second end 310 adapted to receive a repetitive external force to drive the fire-fighting piercing nozzle device 10 into a storage unit or device, and a peripheral side wall 312 extending from the open first end 305 to the closed second end 310. As described above, the repetitive external force applied to the closed second end 310 of the head connector 300 can include a non-sparking hammer, such as a brass or rubber-coated sledgehammer. The peripheral side wall 312, therefore, defines a hollow cavity or chamber between the open first end 305 and the closed second end 310 of the head connector 300.

The closed second end 310 of the head connector 300 generally has a greater thickness than the rest of the peripheral side wall 312 of the head connector 300, because it must withstand repetitive strikes by a hammer, such as a sledgehammer, the back side of a fire axe, or even a two pound carpenter's hammer, for example. Such striking force is used to push the fire-fighting piercing nozzle device 10 into the storage unit.

The head connector 300 further comprises an inner tube 355 substantially containable within the head connector 300, such that the inner tube 355 slightly protrudes beyond the peripheral side wall 312 of the head connector 300. The inner tube 355 includes an open first end 322 positioned near the open first end 305 of the head connector 300, and adapted to engage the open second end 135 of the inner tube 125 of the nozzle tip 100 (having inner tube coupling 140) or the open second end 240 of the inner tube 230 of the extender 200 (having inner tube coupling 250). Also, the inner tube 355 includes an open second end 320 and a peripheral side wall 360 that extends between the open first end 322 and the open second end 320, such that the peripheral side wall 360 defines a hollow cavity or chamber within the inner tube 355.

Generally, the inner tube 355 extends through a first side of the peripheral side wall 312 of the head connector 300, such that the open second end 320 of the inner tube 355 is positioned approximately perpendicular to the closed second end 310 of the head connector 300. Accordingly, the second hollow cavity or chamber of the head container 300 leads out the open second end 320 of the inner tube 355.

Additionally, the head connector 300 comprises a side opening 315 formed by the peripheral side wall 312 of the head connector 300. The side opening 315 is generally positioned on a second, opposite side of the peripheral side wall 312 of the head connector 300, such that the side opening 315 of the head connector 300 is approximately perpendicular to the closed second end 310 of the head connector 300. Accordingly, the first hollow cavity or chamber of the head container 300 leads out the side opening 315.

The head connector 300 includes an external thread 325, or other suitable connecting element, such that the head connector 300 can be connected to the nozzle tip 100 or an extender 200. Typically, the external threads 325 are located on the outside of the peripheral side wall 312 of the head connector 300 near the open first end 305.

Additionally, the head connector includes an external thread 330, or other suitable connecting element, such that the head connector 300 can be connected to a first supply of fire-fighting materials or a first suction source for extracting combustible gas. The external threads 330 are generally located on the outside of the peripheral side wall 312 of the head connector 300 near the side opening 315.

Moreover, the head connector includes an external thread 335, or other suitable connecting element, such that the inner tube 355 of the head connector 300 can be connected to a second supply source of fire-fighting materials or a second suction source for extracting combustible gas. The external threads 335 are generally located on the outside of the peripheral side wall 360 of the inner tube 355 near the second open end 320.

The head connector 300 can further comprise a first temperature coupling 340 and a second temperature coupling 345, wherein the first temperature coupling 340 and second temperature coupling 345 are in communication with each other through a temperature sensor wire 350. The first temperature coupling 340 is generally positioned near the open first end 305 of the head connector 300. The first temperature coupling 340 is adapted to engage the temperature coupling 170 of the nozzle tip 100 or the temperature coupling 260 of the extender 200.

The temperature sensor wire 350 runs from the first temperature coupling 340, through the inside of the inner tube 355, and to the second temperature coupling 345 generally positioned near the open second end 320 of the inner tube 355. The second temperature sensor coupling 345 is adapted to connect to a temperature sensor monitor, such as a thermocouple monitor, voltmeter, or other suitable monitor. In other words, the first temperature sensor coupling 340, second temperature sensor coupling 345, and temperature sensor wire 350 are adapted to relay the temperature reading of the temperature sensor 160 of the nozzle 100 to a temperature sensor monitor.

In operation, the nozzle tip 100, the plurality of extenders 200 (if necessary), and the head connector 300 can be used to either push in one or more fire-fighting materials or extract one or more samples of combustible gases within a device or storage unit. As the fire-fighting piercing nozzle device 10 includes two chambers, multiple combinations of use are possible. First, both chambers may be used to push a substantial amount of one fire-fighting material onto a fire for extinguishment. Second, one chamber may be used for a first fire-fighting material, while the second chamber is used for a second fire-fighting material. Third, both chambers may be used to extract samples of combustible gas for determining the location of the fire or whether the fire has been properly extinguished. Fourth, one of the chambers may be used for pushing a fire-fighting material, while the second chamber may be used for extracting a sample of combustible gas. In effect, the insertion of the fire-fighting piercing nozzle device 10 of the present invention is similar to inserting two piercing nozzles at the same time, but with less effort and more precision.

Many items and material that are stored in bulk silos or bins can spontaneously combust. Such materials include, but are not limited to, pulverized coal or coal pellets, corn, grain, sulfur, or any mineral or vegetable product. Over time the materials being stored can generate heat or can give off gases from decay. These gases or heat can build up to the point where ignition of the materials can occur inside the storage unit. A spontaneous fire may not be detectable immediately because it is within a storage container.

The present invention has a temperature probe on the end of nozzle tip 100 and also has two chambers. The fire-fighting piercing nozzle device 10 can be driven into the storage unit, where a combustible gas sample can be extracted through one of the chambers to help locate the actual point of the fire. Additionally, the temperature sensor 160 can be used for the same purpose. Once the fire is located, or the pocket of combustible gas is located, an injection of water can be applied to cool the area and/or an injection of foam can be applied to break the chemical reaction of the fire. When the fire is finally out, the fire-fighting piercing nozzle device 10 can be used to inject an inert gas (such as $CO_2$), while monitoring the combustion products by extracting a sample from the storage unit. Accordingly, the fire-fighting piercing nozzle device 10 can successfully extinguish a fire and monitor the storage unit to ensure that the stored materials do not reignite.

In a preferred embodiment of the present invention, the fire-fighting piercing nozzle device 10 can be made of any desirable length by the inclusion of multiple extenders 200. An adjustable length permits the fire-fighting piercing nozzle device 10 to be used in storage units of various sizes and allows a fire-fighter to acquire the necessary length to reach the depth of the fire.

One skilled in the art will recognize that the nozzle tip 100, plurality of extenders 200, and head connector 300 can be made of any suitable materials that can withstand extreme temperatures associated with fire. In a preferred embodiment of the nozzle tip 100, plurality of extenders 200, and head connector 300 are generally made of stainless steel type 304 or 316. Stainless steel is typically slick and, therefore, assists in the insertion of the fire-fighting piercing nozzle device 10 into the storage unit. Additionally, stainless steel type 304 or 316 can withstand high temperatures (for a short period of time) of more than 2,000 degrees Fahrenheit.

One skilled in the art will recognize that the nozzle tip 100 can be of any suitable size or length for insertion into a device or storage unit. Generally, the greater the length of the resulting fire-fighting piercing nozzle device 10, the larger the necessary diameter of the nozzle tip 100. In a preferred embodiment of the present invention, the nozzle tip 100 and each extender 200 are approximately five feet in length and approximately one to three inches in diameter. The diameter of the nozzle tip 100 and each extender 200 depends on the storage unit in which the fire-fighting piercing nozzle device 10 will be inserted. For example, a silo having a diameter of five feet would only require a fire-fighting piercing nozzle device 10 having a diameter of approximately one inch, while a silo having a diameter of twenty feet may require a fire-fighting piercing nozzle device 10 having a diameter of approximately three inches. Additionally, as the length of the fire-fighting piercing nozzle device 10 increases, so does the need for a more rigid construction. Accordingly, different diameters can be used for fire-fighting piercing nozzle devices 10 having various lengths.

The diameter of the inner tubes 125, 230, 355 within the nozzle tip 100, each extender 200, and the head connector 300 can be of any appropriate shape and size, although it is usually dependent on the diameter of the nozzle tip 100, each extender 200, and the head connector 300. In a preferred embodiment of the present invention, the diameter of the inner tubes 125, 230, 355 is approximately one-quarter inch to one-half inch smaller than the diameter of the corresponding nozzle tip 100, extender 200, and the head connector 300.

The length of the nozzle tip 100 and each extender 200 can be configured for easy transport by a firefighter. A five foot length of the nozzle tip 100 and each extender 200 generally provides a size that an individual firefighter can easily handle. Under certain circumstances, the length of the nozzle tip 100 and each extender 200 can be larger or smaller without leaving the scope of the present invention. As described above, the length of the fire-fighting piercing nozzle devices 10 can be increased with the addition of multiple extenders 200.

The thickness of the peripheral side wall 115 of the nozzle tip 100 and the peripheral side wall 215 of each extender 200 can vary depending on use. In a preferred embodiment of the present invention, the thickness of the peripheral side wall 115 of the nozzle tip 100 and the peripheral side wall 215 of each extender 200 is approximately an eighth of inch.

The multiple inner tube couplings 140, 250 of the present invention are adapted to seal each section of inner tube 125, 230, 355 of the fire-fighting piercing nozzle device 10, and are capable of withstanding extreme temperatures. For example and not limitation, the inner tube couplings 140, 250 can be made of an elastomer or other fire resistant seal. In a preferred embodiment of the present invention, the inner tube couplings 140, 250 are made of Teflon®, because Teflon® can generally withstand heat up to 500-600 degrees Fahrenheit. As the inner tube coupling 140, 250 is positioned within the fire-fighting piercing nozzle device 10, it will not encounter temperatures as high as the outside of the fire-fighting piercing nozzle device 10.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A firefighting piercing nozzle device comprising:

a dispensing mechanism adapted to dispense at least one fire-extinguishing medium;

a temperature measuring mechanism adapted to measure temperature within a storage unit, wherein the temperature measuring mechanism can assist in determining the location of a fire within the storage unit;

a combustion gas extraction mechanism adapted to extract at least one sample of combustion gas from the storage unit, wherein the combustion gas extraction mechanism can assist in determining the location of a fire within the storage unit;

a nozzle tip having a first chamber and defining a first aperture in communication with the first chamber, whereby the at least one fire-extinguishing medium can be dispensed from the first chamber to the storage unit via the first aperture;

a head connector in communication with the nozzle tip, wherein the head connector includes a striking surface, whereby the nozzle tip is introduced into the storage unit by a force being applied to the striking surface; and at least one extender having a first open end in communication with the nozzle tip and a second open end in communication with the head connector, such that the extender is adapted to increase the distance the nozzle tip can be inserted into the storage unit.

2. The firefighting piercing nozzle device of claim 1, wherein the nozzle tip further comprises a separate second chamber, wherein the nozzle tip defines a second aperture in communication with the second chamber, such that the at least one sample of combustion gas can be extracted from the storage unit via the second aperture.

3. The firefighting piercing nozzle device of claim 2, wherein the temperature measuring mechanism includes a temperature monitor, a coupling, and a signaling wire in communication with the temperature monitor and the coupling.

4. The firefighting piercing nozzle device of claim 3, wherein the temperature monitor is positioned near a tapered distal end of the nozzle tip, while the coupling is positioned near a proximal end of the nozzle tip.

5. The firefighting piercing nozzle device of claim 4, wherein the at least one extender comprises a first chamber corresponding to the first chamber of the nozzle tip and a second chamber corresponding to the second chamber of the nozzle tip.

6. The firefighting piercing nozzle device of claim 5, wherein the at least one extender further comprises a first temperature coupling positioned near a distal end of the extender and adapted to communicate with the coupling of the nozzle tip, a second temperature coupling positioned near a proximal end of the extender, and a signaling wire in communication with the first and second temperature coupling.

7. The firefighting piercing nozzle device of claim 6, wherein the head connector comprises a first chamber corresponding to the first chamber of the nozzle tip and a second chamber corresponding to the second chamber of the nozzle tip, whereby the first chamber of the head connector is adapted to engage a fire-extinguishing medium source and the second chamber of the head connector is adapted to engage a combustion gas suction source.

8. The firefighting piercing nozzle device of claim 7, wherein the head connector further comprise a first temperature coupling positioned near a distal end of the head connection and adapted to communicate with the coupling of the nozzle tip, a second temperature coupling positioned near a proximal end of the head connector and adapted to communicate with a temperature display device, and a signaling wire in communication with the first temperature coupling and the second temperature coupling of the head connector.

9. The firefighting piercing nozzle device of claim 7, wherein the head connector further comprise a first temperature coupling positioned near a distal end of the head connection and adapted to communicate with the second temperature coupling of the extender, a second temperature coupling positioned near a proximal end of the head connector and adapted to communicate with a temperature display device, and a signaling wire in communication with the first temperature coupling and the second temperature coupling of the head connector.

10. A piercing nozzle apparatus comprising:

a nozzle tip having a first chamber separate from a second chamber, wherein the first chamber is adapted to provide a fire-extinguishing medium and the second chamber is adapted to receive a sample of combustion gas, the first and second chambers being substantially cylindrical and coaxial, the first chamber having a different diameter from the second chamber;

a head connector having a striking surface, a first chamber corresponding to the first chamber of the nozzle tip, and a second chamber corresponding to the second chamber of the nozzle tip, wherein a force upon the striking surface inserts the nozzle tip into a storage unit, the first chamber of the head connector is in communication with a fire-extinguishing source, and the second chamber of the head connector is in communication with a combustion gas suction source; and at least one extender in communication with a proximal end of the nozzle tip and a distal end of the head connector, whereby the extender increases the distance the nozzle tip can be inserted into the storage unit.

11. The piercing nozzle apparatus of claim 10, wherein the nozzle tip defines a first aperture in communication with the first chamber of the nozzle tip and a second aperture in communication with the second chamber of the nozzle tip.

12. The piercing nozzle apparatus of claim 11, wherein the at least one extender comprises a first chamber corresponding to the first chamber of the nozzle tip and a second chamber corresponding to the second chamber of the nozzle tip.

13. The piercing nozzle apparatus of claim 10, wherein the nozzle tip further comprises a temperature monitoring mechanism positioned at a distal end of the nozzle tip, a coupling positioned at a proximal end of the nozzle tip, and a singling wire adapted to send a temperature measurement signal from the temperature monitoring mechanism to the coupling.

14. The piercing nozzle apparatus of claim 13, wherein the temperature monitoring mechanism is a thermocouple or a resistance temperature detector (RTD).

15. The piercing nozzle apparatus of claim 13, wherein the at least one extender comprises a first temperature coupling positioned at a proximal end and in communication with the coupling of the nozzle tip, a second temperature coupling positioned at a distal end of the at least one extender, and a signaling wire in communication with the first temperature coupling and the second temperature coupling.

16. The piercing nozzle apparatus of claim 15, wherein the head connector comprises a first temperature coupling positioned at a proximal end of the head connector and in communication with the coupling of the nozzle tip, a second temperature coupling positioned at a distal end of the head connector and in communication with a temperature display device, and a signaling wire in communication with the first temperature coupling and the second temperature coupling of the head connector.

17. The piercing nozzle apparatus of claim 15, wherein the head connector comprises a first temperature coupling positioned at a proximal end of the head connector and in communication with the coupling of the nozzle tip, a second temperature coupling positioned at a distal end of the head connector and in communication with a temperature display device, and a signaling wire in communication with the first temperature coupling and the second temperature coupling of the head connector.

18. The piercing nozzle apparatus of claim 15, wherein the head connector comprises a first temperature coupling positioned at a proximal end of the head connector and in communication with the second temperature coupling of the at least one extender, a second temperature coupling positioned at a distal end of the head connector and in communication with a temperature display device, and a signaling wire in communication with the first temperature coupling and the second temperature coupling of the head connector.

19. A piercing nozzle device comprising:

a nozzle tip having a tapered distal end and an open proximal end, wherein the nozzle tip houses a first chamber and a separate second chamber and defines a first aperture in communication with the first chamber and a second aperture in communication with the second chamber, such that the first chamber is adapted to inject a fire-extinguishing medium into a container and the second chamber is adapted to receive a sample of gas from within the container, the first and second chambers being substantially cylindrical in shape and coaxial, the second chamber extending through the first chamber;

a temperature measuring device adapted to monitor the temperature within the container, wherein the temperature measuring device is positioned near the tapered distal end of the nozzle tip;

a head connector having a striking surface, a first chamber corresponding to the first chamber of the nozzle tip, and a second chamber corresponding to the second chamber of the nozzle tip, wherein a force upon the striking surface inserts the nozzle tip into a storage unit and wherein the first chamber of the head connector is in communication with a fire-extinguishing source and the second chamber of the head connector is in communication with a suction source; and at least one extender in communication with a proximal end of the nozzle tip and a distal end of the head connector, wherein the extender increases the distance the nozzle tip can be inserted into the storage unit and wherein the at least one extender is adapted to connect the first chamber of the nozzle tip with the first chamber of the head connector and the second chamber of the nozzle tip with the second chamber of the head connector.

* * * * *